April 13, 1937. J. W. RACKLYEFT Re. 20,331

IRONING MACHINE

Original Filed Feb. 10, 1927 4 Sheets-Sheet 1

JOHN W. RACKLYEFT
INVENTOR
BY Smith and Freeman
ATTORNEYS

April 13, 1937. J. W. RACKLYEFT Re. 20,331

IRONING MACHINE

Original Filed Feb. 10, 1927 4 Sheets-Sheet 2

JOHN W. RACKLYEFT
INVENTOR
BY Smith and Freeman
ATTORNEYS

April 13, 1937. J. W. RACKLYEFT Re. 20,331

IRONING MACHINE

Original Filed Feb. 10, 1927 4 Sheets-Sheet 3

JOHN W. RACKLYEFT
INVENTOR
BY Smith and Freeman
ATTORNEYS

IRONING MACHINE

Original Filed Feb. 10, 1927 4 Sheets-Sheet 4

JOHN W. RACKLYEFT
INVENTOR
BY Smith and Freeman
ATTORNEYS

Reissued Apr. 13, 1937

Re. 20,331

UNITED STATES PATENT OFFICE 20,331

IRONING MACHINE

John W. Racklyeft, Cleveland, Ohio, assignor to The Apex Electrical Manufacturing Company, Cleveland, Ohio, a corporation of Ohio Original No. 1,868,806, dated July 26, 1932, Serial No. 167,314, February 10, 1927. Application for reissue April 7, 1934, Serial No. 719,617

44 Claims. (Cl. 38—59)

This invention relates to ironing machines and has for its objects the provision of a simplified and improved design of small sized, compact, open end machine wherein the ironing pressure is produced by the same motor which operates the machine and which can readily be folded into a more compact position when not in use. Other objects of the invention are the production and improved construction of an open end ironing machine whereby an improved degree of rigidity is obtained, and whereby the ironing pressures are equalized at different points; the provision of new and improved means of supporting and manipulating the roll; the provision of an improved emergency release; the provision of improved mechanism whereby both the approach and the recession of the ironing parts are caused to occur in a uniform and orderly manner; the provision of a new and improved clutch; while further objects and advantages of the invention will become apparent as the description proceeds.

Figure 1:
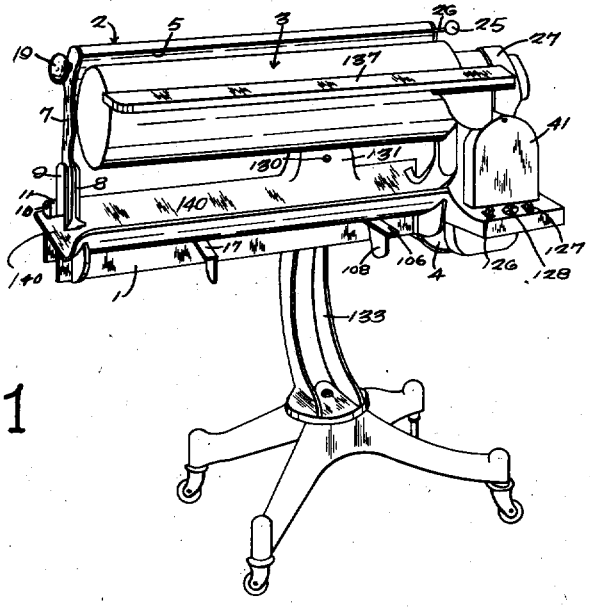
Figure 2:
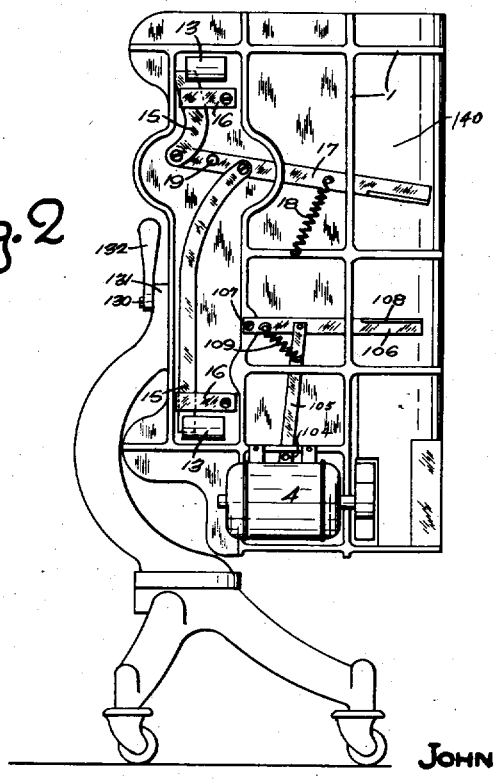
Figures 3, 4:
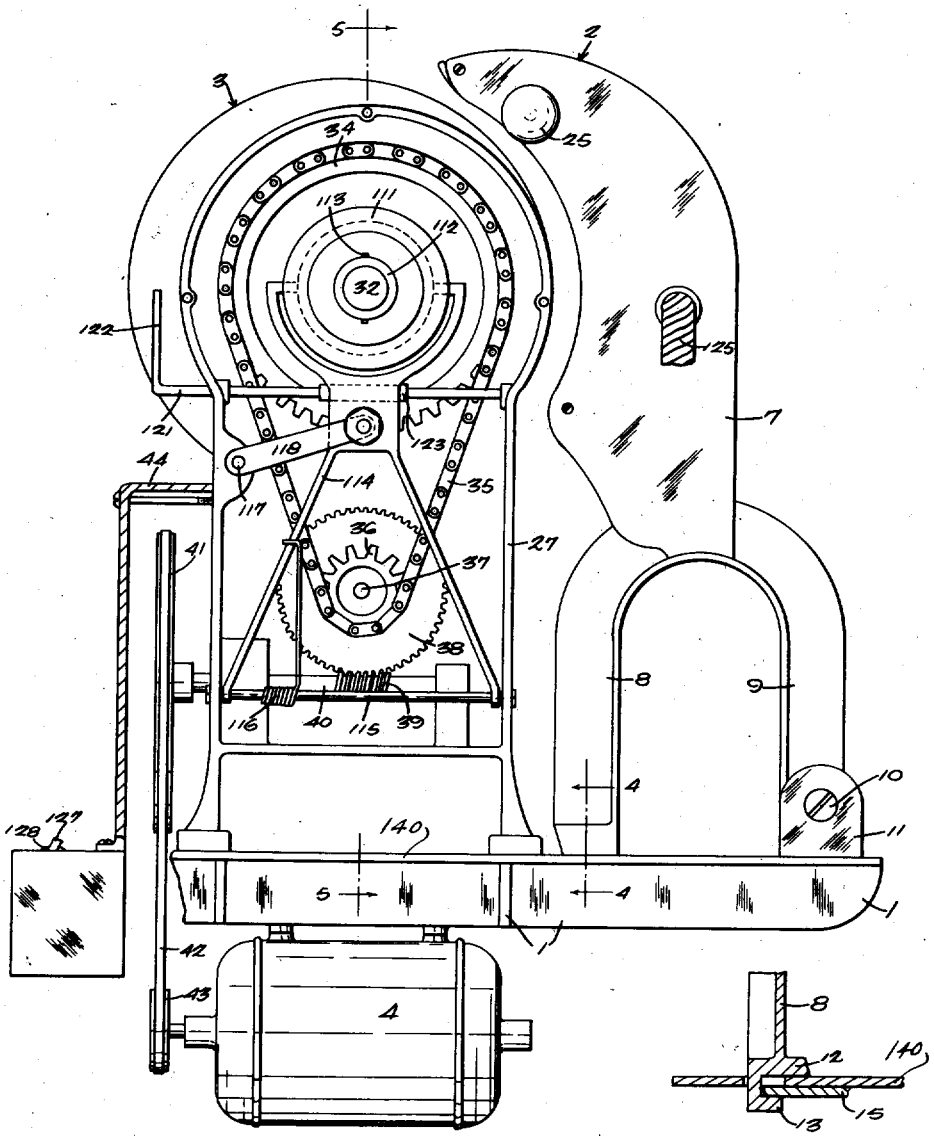
Figure 5:
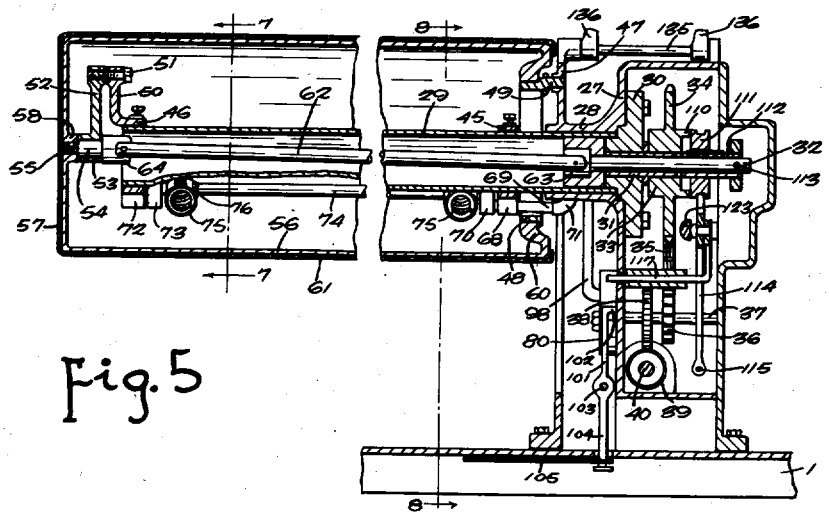
Figure 6:
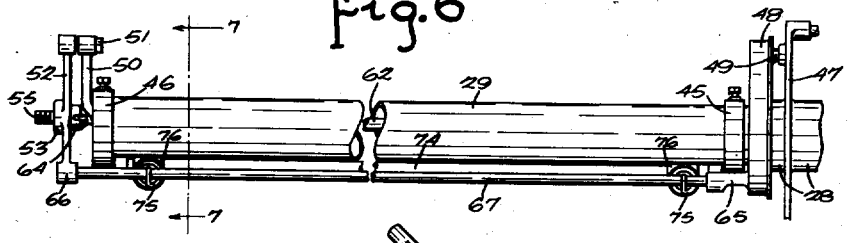
Figure 7:
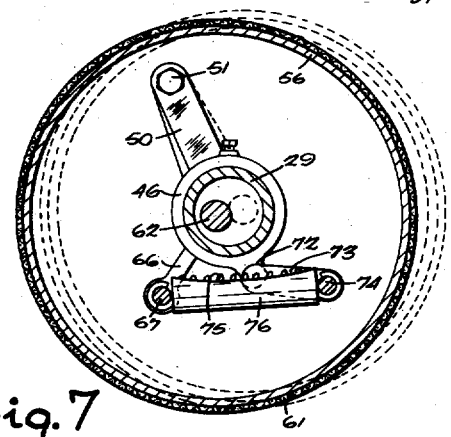
Figure 11:
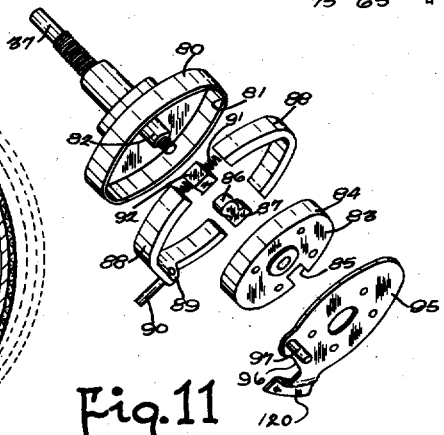
Figure 8:
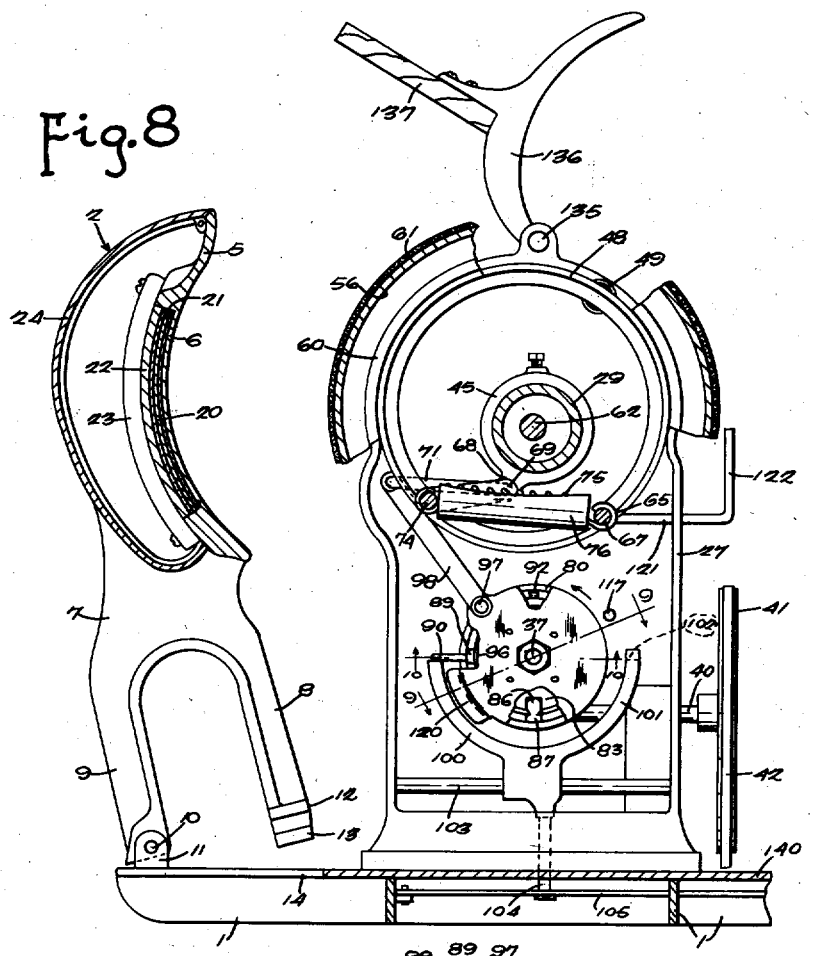
Figure 9:
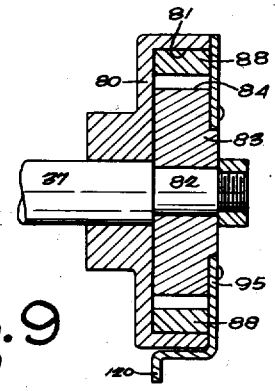
Figure 10:
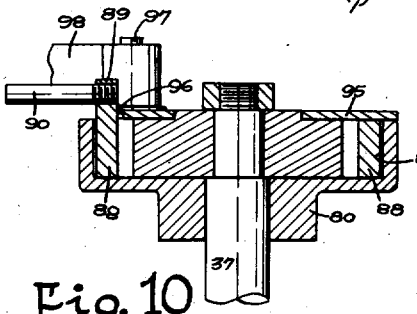

In the drawings accompanying and forming a part of this application Fig. 1 is a perspective view of an ironing machine embodying my invention; Fig. 2 is an elevation of the same machine, with the frame swung to vertical position and the bottom of the same being shown; Fig. 3 is an end elevation of the apparatus mounted upon the frame with the cover-plate of the gear-housing removed; Fig. 4 is a detail view corresponding to the line 4—4 of Fig. 3 showing the emergency release; Fig. 5 is a longitudinal sectional view of the roll and its operating mechanism corresponding to the line 5—5 of Fig. 3; Fig. 6 is a detail view of part of the roll mechanism shown in Fig. 5, the roll itself being omitted; Figs. 7 and 8 are enlarged sectional views taken on the lines 7—7 and 8—8 of Figs. 5 and 6 looking in the direction of the arrows; Figs. 9 and 10 are sectional views of the clutch corresponding to the lines 9—9 and 10—10 respectively of Fig. 8; and Fig. 11 is a separated perspective view illustrating the different parts of the said clutch removed from each other.

My improved ironing machine comprises a rigid frame 1 on which are carried the shoe indicated generally at 2, the roll indicated generally at 3, the motor 4, and the mechanism for rotating the roll and for producing and relieving the ironing pressure, together with the levers with which such mechanism is controlled.

The shoe, as best shown in Fig. 8, includes the metallic plate 5 having the concave ironing face 6 and the end frames 7 which support the same. These frames are provided with the front legs 8 and rear legs 9, the latter being pivotally mounted at 10 upon lugs 11 carried by the rear of the frame near its ends. The front legs have the feet 12 engaging the upper face of the frame and the depending hooks 13 adapted to extend through openings 14 and to be engaged by catches 15 to hold the iron in operative position. These catches 15 are slidably mounted in the guides 16 carried by the frame and are adapted to be moved longitudinally into or out of engagement with the hooks by means of the actuating lever 17, which extends transversely of the frame adjacent to its lower face and projects to where it can conveniently be moved by the operator. This lever is pivoted at 19 to the frame and is articulated at opposite sides of its pivot to the catches 15—15, the arrangement being such that upon swinging the lever 17 against the tension of the spring 18 the catches 15 are simultaneously moved out of engagement with the hooks 13, thus enabling the shoe to rock to the position shown in Fig. 8 for cleaning, waxing, emergency, etc. A handle of heat insulating material is preferably provided to assist this movement or to restore the iron to working position.

Any desired heating agent can be employed, electricity being the agent herein provided for, a resistance heating element 20 being located in a recess 21 formed in the rear face of the member 5, and backed up by insulating material 22, the latter being secured in place by clamps 23. I have shown the rear of this shoe as covered by a hollow sheet metal casing 24 which further shields the heating arrangement. I have also shown the shoe as provided with an upwardly projecting metal ball 25, supported in heat conducting relation with the member 5 by means of the neck 26 and adapted for smoothing ruffles and the like.

Carried by the frame 1 in front of and at one end of said shoe is a hollow metal housing 27 which constitutes an enclosure for the operating mechanism and a support for the roll and rest. This housing preferably rises directly from the frame 1, substantially without lateral extensions, at least on the side adjacent to the shoe, as shown in Fig. 3. Projecting from one face of this housing, with its axis spaced from and parallel to that of the concave face of the element 5, is a hub 28 in which is rigidly mounted, as by being shrunk therein, the horizontal cylindrical tube 29. Rigidly secured inside the housing is a bearing block 30 which carries the rigid tubular bearing sleeve 31 in which is rotatably journaled the stub shaft 32. Rotatably journaled on the exterior of the tube 31 is the hub 33 of a sprocket wheel 34 connected by a driving chain 35 with the sprocket wheel 36 carried on a lay shaft 37 which also possesses a worm gear 38 meshing with a worm 39. This worm is carried by a cross shaft 40 having the pulley 41 driven by a belt 42 from a pulley 43 on the shaft of the motor 4. The pulley 41 is covered by a removable sheet metal housing 44 separate from and in front of the housing 27.

Rigidly clamped upon the tube 29 are the fittings 45 and 46, adjacent to the opposite ends of the same, while carried by the hub 28 is a rigid bracket 47. Loosely surrounding the tube 29 is a cylindrical bearing ring 48 pivoted to the bracket 47 on a horizontal axis 49 above and parallel to the shaft 29. Rigid with the fitting 46 is an arm 50 having at its free end a pivot 51 coaxial with the pivot 49, and carried thereby is a swinging arm 52 having at its free end a journal member 53 in which is journaled the stub shaft 54 whose outer end is threaded at 55 for the reception of the roll. This roll comprises a cylindrical sheet metal casing 56 having at one end a head 57 formed with a threaded socket 58 for the reception of the threads 55, and having at the opposite end a circular ring 60 adapted to run upon the surface of the ring 48. The exterior of the roll is covered with padding material 61 of the usual or any suitable substance. The stub shaft 32 is operatively connected to the stub shaft 54 by means of the drive shaft 62 provided at opposite ends with the universal joints 63 and 64 respectively. The diameter of the tube 29 is so chosen intermediate the external diameter of the shaft 62 and the internal diameter of the ring 48 as to permit the bodily movement of the roll about the axes 49—51 as indicated in Fig. 7, the shaft 62 moving from one position to another inside the tube corresponding with the movement of the roll outside said tube.

To accomplish this movement of the roll I have shown the following mechanism: Rigid with the ring 48 is a bracket 65 and rigid with the member 53 is a bracket 66 and to said brackets are secured the two ends of the rod 67. Projecting from the fitting 45 is an ear 68 in which is journaled a rock shaft 69 to the opposite ends of which are secured levers 70 and 71 respectively. Carried by the fitting 46 is a projection 72 to which is pivoted a lever arm 73 similar to that at 70, and the free ends of the lever arms 70 and 73 are connected by a rod 74 which is resiliently connected at opposite ends to the rod 67 by tension springs 75—75. In order to fix the distance between these rods and maintain a certain minimum tension on the springs, suitable spacers are also preferably interposed between the two rods, such as the split metal tubes 76 which partially surround the springs 75. It will be seen that rocking the shaft 69 in one direction or the other will cause a movement of the rod 74 toward and from the shoe which movement will be communicated to the rod 67 by way of these springs.

To effect this rocking movement by the action of the power of the motor 4 I have shown the following mechanisms: the lay shaft 37 projects through the forward wall of the housing 27 and is there provided with a clutch of the construction shown in Figs. 8, 9, 10, and 11. Rigidly secured to the shaft so that it may rotate therewith is a member 80 having an internal cylindrical bearing face 81, and rotatably mounted upon an extension 82 of said shaft concentric with the surface 81 is a metal disk 83 having a cylindrical surface 84 concentric with and spaced from the surface 81. Formed in the disk 83 transversely of its surface is a rectangular notch 85 in which is mounted the rounded inner end 86 of a rocker whose squared outer end 87 extends into the space between the surfaces 81 and 84. The remainder of the space between these members is taken up by a couple of arcuate friction members 88—88 which are preferably mere semi-circular metal rings of such size as to fit freely into the space defined thereby. One of these friction members is provided with an ear 89 projecting laterally beyond the surface 81 where it is provided with a radial pin 90 which projects beyond the periphery of the clutch. In order to render the action of the clutch more uniform and certain I preferably interpose a small spring 91 between the members 88—88, and I also preferably interpose between these ends, and surrounding the spring, a hollow spacing block 92. This spring, when used at all, should be very weak since its purpose is merely to create a very small amount of friction; and the block 92 is used primarily to facilitate the construction of the clutch by enabling the use of blocks of different widths to compensate for variations in the length of the members 88—88. So far as the operation of the clutch is concerned the block is not necessary, nor is the spring of any advantage further than to make certain the operation of the device as will hereafter be shown.

To the outer face of the disk 83 I secure a metal plate 95 which preferably covers the entire face of the clutch excepting at the point 96 where it is notched for the free passage of the ear 89. Carried by the plate 95 is a pin 97 to which is articulated the connecting rod 98 whose opposite end is articulated to the free end of the lever 71. With this arrangement the roll will be advanced and retracted every revolution of the plate 95, and it only remains to provide means to arrest this rotation and hold the device stationary at the desired positions.

For this purpose I provide a yoke having two upstanding branched arms 100—101 terminating in fingers 102 one at each side of the clutch. This yoke is mounted for pivotal movement upon a horizontal transverse rod 103 and is provided with a depending operating lever 104 extending below the frame where it is connected to the link 105 which in turn is connected to the lever 106 pivoted to the frame at 107 and terminating in the depending pad 108 for engagement by the operator's knee. This yoke is normally held by the coil spring 109 in a position so that one of its fingers will engage the pin 90.

The operation of the clutch is as follows: the shaft 37 and clutch member 80 rotate continuously; if the yoke member be displaced or removed, the initial friction of the surface 81 against the members 88—88 tends to displace the latter very slightly relative to the disk 83, and this movement inclines the rocker 86 which thereupon wedges the members 88—88 more widely apart and into strong driving engagement with the surface 81. If now the yoke be moved to interpose one of its fingers in the path of the pin 90, the rotation of the friction member is instantly arrested, which permits the rocker 86 to straighten up, which reduces the friction between the members 80 and 88 to the very small amount caused by the spring 91 or its equivalent. Each time the yoke is displaced this same cycle of events takes place, but with this difference, that if upon the releasing movement of the roll when the tension spring causes the clutch to try to overrun the mechanism, the key is inclined to the opposite direction and the receding movement is restrained. The purpose of the spring 91 is merely to insure the existence of sufficient initial friction to start the inclination of the rocker; and the block 92 or its equivalent is desirable merely because it is necessary that the driving engagement of the friction members and outer drum be produced positively and without any undue inclination of the rocker. When properly made and adjusted, a clutch capable of transmitting a substantial load can be arrested and held stationary by a very gentle pressure on the pin 90.

The yoke may have any desired number of fingers, arranged at any desired position about the clutch, each finger accordingly corresponding to a different position of rest. In the present embodiment I have illustrated a yoke having two fingers so located that in one position the mechanism will be arrested with the roller advanced towards the shoe as illustrated in Fig. 8, at which time it is preferable that the pin 97 stand just beyond the dead center (as reckoned from the free end of the arm 71), the opposite position of rest being approximately 180° therefrom at which time the roll is retracted from the shoe by its fullest extent.

It is also desirable that the roll should be rotated only while in contact with the shoe, and should stand still at other times, thereby facilitating the application thereto of the articles to be ironed. To this end I have provided the mechanism shown in Figs. 3 and 5 wherein one face of the hub 33 is provided with clutch teeth 110 cooperating with similar teeth formed on the face of a clutch spool 111 slidably splined to the exterior of a tube 112 pinned to the shaft 32 at 113. Cooperating with this spool is a shifting lever 114 pivoted to a suitable cross bar 115, and normally held in engaging position by a suitable spring 116. Slidably mounted in the housing 27 is a rod 117, one of whose ends is operatively secured to the lever 114 by the arm 118. The opposite end of the rod 117 projects close to the clutch member 90 and the plate 95 is provided at one point with an overhanging cam-faced flange 120, adapted at the proper phase of rotation to press against the rod 117 to disengage the clutch 111 against the tension of the spring 116. It is also desirable in some cases, as when such a machine is to be used for pressing clothing, that the roll shall not be turned even when brought into contact with the shoe and to effect this I provide a suitable cam shaft 121 actuated by a handle 122 and having a cam portion 123 adapted when turned in one position to allow engagement of the clutch 111, and when turned in the opposite direction to prevent such engagement.

When electrical heat is employed the conductor wires are brought into the shoe 2 by way of the flexible conduit 125. The operation of the heater and motor are controlled by independent switches 126—127 respectively carried by the frame in a convenient location, a pilot light 128 being preferably employed to indicate when the shoe is being heated.

For the purpose of mounting the frame 1 so that it may be swung to vertical position and occupy less floor space I have provided a single pivot located substantially at the center of gravity of said frame and the mechanism carried thereby. Accordingly the device is substantially balanced at all times, is free from upsetting, and exhibits no lack of stability even though the pivot be not clamped. As such pivot I have shown a screw 130 threaded into the lug 131 extending upwardly from the rear of the frame and furnished with a handle 132 by which it may be tightened. The shank of this screw is journaled in the upper end of the pedestal 133. The use of the removable pivot screw, coupled with the balancing of the parts, facilitates the manipulation and delivery of the machine by one man.

Carried by the top of the housing 27 is a horizontal longitudinal shaft 135 on which is pivoted a bracket 136 to which is secured a horizontal rest 137 which projects close to the roll 3 so as to facilitate the feeding of articles thereto. The pivotal mounting of this bracket enables this rest to be swung upwardly and out of the way when it is necessary to remove or recover the roll. The top of the frame is preferably covered with a sheet or tray 140 which can either be integral therewith as shown in Figs. 2, 3, 4, and hence a part of the frame, or it may be separate therefrom as shown in Fig. 8.

Having thus described my invention what I claim is:

1. In an ironing machine, the combination with a frame, of a shoe pivotally mounted upon said frame, a roll adapted to cooperate with said shoe, and means for holding said shoe in predetermined position upon said frame and operable to release said shoe, said means comprising a lever terminating near the front of said frame and catches connected to said lever and engaging extensions of said shoe.

2. In an ironing machine, the combination with a frame, of a shoe rigidly attached to said frame, a hollow roll, a support for said roll located at one end of said roll and secured to said frame, means for moving said roll toward and away from said shoe, and spring means inside said roll adapted to compensate for inequalities of pressure at opposite ends of said roll.

3. In an ironing machine, the combination with a frame, of a shoe fixedly secured to said frame, a hollow roll movable toward and from said shoe, a support for said roll located at one end of said roll and secured to said frame and projecting inside said roll, a motor carried by said frame, mechanism driven by said motor for rotating said roll and also for moving it toward and from said shoe, and means for equalizing the pressures produced by said mechanism at opposite ends of said roll.

4. In an ironing machine, the combination with a rigid shoe, of a rigid member supported at one end and projecting alongside said shoe, a hollow roll surrounding and rotatably supported by said rigid member, and means inside said roll for compensating for unequal pressures exerted at the ends of said roll.

5. In an ironing machine, the combination with a shoe, of a hollow rotatable roll, bearings for said roll, one at each end thereof, and a support for said bearings located at one end of said shoe and extending into said roll, said bearings being relatively movable, and yielding means connecting said bearings for equalizing the pressure upon the end portions of said roll.

6. In an ironing machine, the combination with a shoe, of a hollow roll supported wholly at one end and movable toward and away from said shoe, mechanism located inside said roll for moving said roll toward and away from said shoe, and an electric motor operatively connected to said roll and to said mechanism, such connections including disconnectable elements.

7. In an ironing machine, the combination with a fixed shoe, of a roll located alongside said shoe and supported solely at one end of said shoe, said roll being hollow and having a bearing at each end and means including spring devices for permitting relative movement of said bearings to compensate for unequal pressures at opposite ends of said roll.

8. In an ironing machine, the combination with a rigid shoe, of a rigid tube supported at one end and projecting alongside said shoe, a hollow rotatable roll surrounding said tube, a drive shaft projecting loosely through said tube and operatively connected to the far end of said roll, and means for shifting said roll laterally of said tube while retaining its operative connection to said shaft.

9. In an ironing machine, the combination with a rigid shoe, of a rigid tube supported at one end and projecting alongside said shoe, a hollow rotatable roll surrounding said tube, a drive shaft projecting loosely through said tube and operatively connected to the far end of said roll, means for shifting said roll laterally of said tube while retaining its operative connection to said shaft, and mechanism inside said roll for equalizing the pressure upon the end portions of said roll.

10. In an ironing machine, in combination, a frame, a rigid shoe carried thereby, a support carried by said frame at one end of said shoe and spaced from said shoe, a roll carried by said support, the opposite end of said roll being free and said roll being hollow, and mechanism inside said roll for advancing and retracting the same and for exerting equal pressure upon the end portions of said roll.

11. In an ironing machine, the combination with a shoe, of a hollow roll adapted to cooperate therewith, pivotally mounted carriers at the opposite ends of said roll, a longitudinal rod extending within said roll and connected to said carriers, a second rod alongside said first rod, a crank device for swinging said second rod laterally, and connections between said rods at each end, said connections including spring devices whereby said carriers may move unequally.

12. In an ironing machine, the combination with a drive shaft having one end adapted to swing, of a roll mounted at one end upon the swinging end of said drive shaft, and a carrier for the other end of said roll adapted to swing simultaneously with the swinging end of said drive shaft.

13. In an ironing machine, the combination with a frame of a shoe carried thereby, a tube located alongside and spaced from said shoe and having one end secured to said frame, a pair of spaced supporting members eccentrically pivoted relatively to said tube, one at each end thereof, a hollow roll surrounding said tube, a drive shaft located inside said tube and operatively connected to said roll, and means for swinging said supporting members to move said roll toward and from said shoe.

14. In an ironing machine, the combination with a tube, of fixtures rigidly secured to said tube near its ends, an annular carrier surrounding said tube near one end and eccentrically pivoted relative thereto, a second carrier at the opposite end of said tube and pivotally mounted upon the other fixture, a drive shaft extending within said tube and journaled in said last mentioned carrier, and a roll having one end mounted upon said first mentioned carrier and the other end secured to said drive shaft.

15. In an ironing machine, a supporting structure, a shoe, shoe supporting means carried by said supporting structure, a supporting member carried by said supporting structure parallel to and spaced from and at one side of said shoe, a hollow roll surrounding said member, carriers located in the space between said member and roller, mechanism cooperating with said carriers to move said roll bodily toward and from said shoe, an electric motor carried by said supporting structure, and driving devices connecting said motor with said roll and with said mechanism.

16. In an ironing machine, the combination with a hollow housing of a horizontal tube having one end rigidly supported by said housing and the other end projecting freely, a hollow roll surrounding said tube, bearings for said roll located at opposite ends of said tube, said bearings being movable laterally relative to said tube and to each other, a drive shaft located inside said tube and connected to the far end of said roll, a rock shaft inside said roll and connected to said bearings, and mechanism in said housing for operating both said shafts.

17. In an ironing machine, the combination with a frame, of a hollow housing, a rigid member carried by and projecting from said housing, a hollow roll surrounding said member, bearings for said roll pivoted for movement relatively to said member upon an axis which is eccentric of and substantially parallel to the roll axis, a movable member carried by said rigid member and operatively connected to said bearings whereby they may be moved laterally of said rigid member, and mechanism in said housing for rotating said roll and for moving and holding said movable member.

18. In an ironing machine, the combination with a frame and a stationary shoe carried thereby, of a rigid supporting member secured to said frame at one end and projecting alongside said shoe at a distance from said frame, a hollow roll surrounding said member, bearings for said roll carried by said member and movably mounted relative to said member and to each other, means for moving and holding said bearings, a stub shaft at one end of said roller, and a drive shaft inside said roller having universal connection with said roller and stub shaft.

19. In an ironing machine, the combination with a frame of a hollow housing carried thereby, a rigid member carried by and projecting substantially horizontally from said housing, a hollow roll surrounding said member and spaced therefrom, bearings for said roll pivoted for movement relatively to said member upon an axis which is eccentric of the roll axis, a shoe carried by said frame at one side of said roll, a movable member carried by said rigid member and located inside said roll and operatively connected to said bearings whereby they may be moved laterally of said rigid member to thereby move said roll toward and from said shoe, means for equalizing the contact-pressure between opposite ends of said roll and shoe, and mechanism in said housing for rotating said roll and for moving and holding said movable member.

20. An ironing machine comprising in combination, a shoe, a roll disposed in juxtaposition to the said shoe, means for rotatably supporting one end of the roll, a fixed member for rotatably supporting said means for movement about an axis eccentric to the axis of rotation of said roll, driving means for the roll, and means inside said roll and actuated by the said driving means for moving said first named means to shift the position of the roll with respect to the said shoe.

21. An ironing machine comprising in combination, a shoe, a roll disposed in juxtaposition to the said shoe, means for rotatably supporting one end of the roll, means for rotatably supporting said first named means for movement about an axis eccentric to the axis of rotation of said roll, driving means for the roll, and yielding means inside said roll and actuated by the said driving means for moving said first named means to shift the position of the roll with respect to said shoe.

22. In an ironing machine, a shoe, a roll mounted for co-action therewith, bearing means for rotatably supporting the roll, means inside the roll for shifting the bearing means to move the roll into or out of engagement with the shoe, a motor for rotating the roll, a connection between the motor and the second-named means for effecting the operation of said means to move the roll, and means for stopping the rotation of the roll.

23. An ironing machine including a shoe, a roll disposed for cooperation with the shoe, means for rotatably supporting the roll, means for supporting said first named means for movement laterally of the axis of rotation of said roll, driving means for rotating the roll, and means inside the roll and actuated by said driving means for operating said first-named means to shift the position of the roll with respect to said shoe.

24. An ironing machine comprising a heated shoe and a cooperating rotatable roll mounted for bodily movement into and out of pressing contact with the heated shoe, means for rotatably supporting said roll including a fixed support inside the roll and a member to which the roll is journaled carried by said support inside the roll for movement about an axis eccentric to the roll axis, driving means for rotating said roll, and means actuated by said driving means for operating said first named means in effecting the aforesaid bodily movements of said roll.

25. An ironing machine comprising, a pair of cooperating ironing elements including a heated shoe and a padded roll, a supporting structure for said ironing elements, a shoe supporting arm pivotally attached to said structure for movement about a horizontal axis, power means for shifting said padded roll into and out of pressing engagement with said shoe, and safety release means for manually releasing said shoe from pressing engagement with said roll independently of the operation of said power means, said safety release means comprising means engaging said shoe supporting arm at one side of its pivot axis and an operating member terminating near the front of said supporting structure intermediate the ends thereof in a position accessible to the operator of the machine for effecting the release of said last named means from engagement with said shoe supporting arm.

26. An ironing machine comprising, a pair of cooperating ironing elements including a heated shoe and a padded roll, a supporting frame for said ironing elements including a top member which provides a work receiving surface beneath said ironing elements, a shoe supporting arm pivotally attached to said frame for movement about a horizontal axis, power means for shifting said padded roll into and out of pressing engagement with said shoe, and safety release means for manually releasing said shoe from pressing engagement with said roll independently of the operation of said power means, said safety release means comprising means engaging with said shoe supporting arm at one side of its pivot axis and an operating member located beneath said top member intermediate the ends thereof in a position accessible to the operator of the machine for effecting the release of said last named means from engagement with said shoe supporting arm.

27. In an ironing machine, the combination with a supporting structure, of a shoe, mounting means for said shoe carried by said supporting structure for supporting said shoe in a substantially fixed position, a hollow roll movable toward and from said shoe, a support means for said roll rigid with said supporting structure and projecting inside said roll, a motor, mechanism driven by said motor for rotating said roll and also for moving it toward and from said shoe, and means for equalizing the pressures produced by said mechanism at opposite ends of said roll.

28. In an ironing machine, the combination with a heated shoe and a rotatable padded roll, of a support for said shoe and roll, power means for rotating said roll and for effecting relative movement between said roll and shoe for bringing them into and out of pressing engagement with each other, and means inside said roll for compensating for unequal pressures exerted at the ends of said roll.

29. In an ironing machine, the combination with a supporting structure, of a shoe, shoe mounting means carried by said supporting structure, a supporting means carried by said supporting structure parallel to and spaced from and at one side of said shoe, a hollow roll surrounding said means, carriers located in the space between said means and roller, mechanism cooperating with said carriers to move said roll bodily toward and from said shoe, an electric motor, and driving devices connecting said motor with said roll and with said mechanism.

30. In an ironing machine, the combination with a frame, of a rigid member carried by said frame, a hollow roll supported from said member, a bearing for said roll pivoted upon an axis which is eccentric of and substantially parallel to the roll axis, a movable member carried by said rigid member and operatively connected to said bearing whereby said bearing may be moved laterally of said rigid member by said movable member, and power mechanism for rotating said roll and for moving and holding said movable member.

31. In an ironing machine, the combination with a supporting structure of a rigid member carried by said supporting structure, a hollow roll supported from said member and spaced therefrom, bearings for said roll pivoted upon an axis which is eccentric of the roll axis, a shoe, means carried by said supporting structure for supporting said shoe at one side of said roll, a movable member carried by said rigid member and operatively connected to said bearings whereby they may be moved laterally of said rigid member to thereby move said roll toward and from said shoe, means for equalizing the contact-pressure between opposite ends of said roll and shoe, and mechanism for rotating said roll and for moving and holding said movable member.

32. In an ironing machine, the combination with a substantially fixed shoe and a cooperating rotatable roll, of means for supporting said roll for rotational movement and also for bodily movement relative to said shoe, power means for effecting such movements comprising a disconnectible driving connection to said roll, laterally movable bearing means for said roll carried by a fixed part of the machine which fixed part projects inside said roll and means for controlling the rotation of said roll and the movement of said bearing means.

33. In an ironing machine, the combination with a substantially fixed shoe and a cooperating rotatable roll, of means for supporting said roll for rotational movement and also for bodily movement relative to said shoe, power means for effecting such movements comprising a disconnectible driving connection to said roll, laterally movable bearing means for said roll carried by a fixed part of the machine which fixed part projects inside said roll and controllable means including a clutch for effecting the shifting of said bearing means and roll and for automatically initiating or stopping the rotation of said roll in accordance with the bodily movements thereof.

34. In an ironing machine, the combination with a substantially fixed shoe and a cooperating rotatable roll, of means for supporting said roll for rotational movement and also for bodily movement relative to said shoe, power means for effecting such movements comprising a disconnectible driving connection to said roll, laterally movable bearing means for said roll carried by a fixed part of the machine which fixed part projects inside said roll, controllable means including a clutch for effecting the shifting of said bearing means and roll and for automatically initiating or stopping the rotation of said roll in accordance with the bodily movements thereof, and selective means for rendering said roll driving connection inoperative irrespective of the bodily movements of said roll.

35. In an ironing machine, the combination with a substantially fixed shoe and a cooperating rotatable roll, of means for supporting said roll for rotational movement and also for bodily movement relative to said shoe, power means for effecting such movements comprising a disconnectible driving connection to rotate said roll and shaft means journaled in a fixed part of the machine connected at one end to said roll and bodily movable therewith, said shaft means having universal joints at its opposite ends for permitting the shifting of the shaft as aforesaid, eccentrically and movably supported roll bearing means carried by a fixed part of the machine whereby upon movement of said bearing means the roll is shifted and operator-operated means for controlling the rotation of said roll and the movement of said bearing means.

36. An ironing machine comprising in combination, a shoe, a roll disposed in juxtaposition to the said shoe, means for rotatably supporting one end of the roll, means for rotatably supporting said first named means for movement laterally of the axis of rotation of said roll, driving means for the roll including gearing part of which is fixed to rotate with the roll, and means inside said roll and actuated by the said driving means for moving said first named means to shift the position of the roll with respect to the said shoe.

37. In an ironing machine, the combination with an ironing shoe, of a rigid tube supported at one end and projecting alongside said shoe, a hollow rotatable roll surrounding said tube, a drive shaft projecting loosely through said roll and operatively connected to the far end thereof, and means for shifting said roll laterally of said tube while retaining its operative connection to said shaft.

38. In a machine of the class described, an ironing shoe, a supporting structure therefor having a work receiving surface below the shoe, a hollow housing carried by said supporting structure, mechanism in said housing, a tubular member carried by and projecting from said housing alongside of said shoe and above the work receiving surface of said supporting structure, the end of said tubular member remote from said housing being free and unsupported, an ironing roll rotatably mounted on said tubular member and supported solely from one end by means of said housing and said tubular member, means for shifting said roll into and out of pressing contact with said shoe including a laterally displaceable roll-carrying bearing member carried by said tubular member and means for moving said bearing member, and means for rotating said roll including a drive shaft inside said tubular member operatively connected to said roll and to said mechanism.

39. In a machine of the class described, an ironing shoe, a supporting structure therefor having a work receiving surface below the shoe, a hollow housing carried by said supporting structure, mechanism in said housing, a tubular member supported from one end by said housing and projecting therefrom alongside of said shoe and above the work receiving surface of said supporting structure, the end of said tubular member remote from said housing being free and unsupported, an ironing roll rotatably mounted on said tubular member supported solely from one end by means of said housing and said tubular member, means for shifting said roll into and out of pressing contact with said shoe including a laterally displaceable roll-carrying bearing member carried by said tubular member and means for moving said bearing member, and means for rotating said roll including a drive shaft inside said tubular member operatively connected to said roll and to said mechanism, said roll rotating means including an electric motor operatively connected to said mechanism and a disconnectible driving connection between the motor and the roll.

40. In an ironing machine, the combination with a shoe, of a hollow roll adapted to cooperate therewith, bearing means for the roll mounted inside the roll for movement about an axis to one side of the roll axis for shifting the roll into and out of pressing engagement with the shoe, a member extending lengthwise inside of the roll between the ends thereof and operatively connected to said bearing means and movable therewith, and power means for shifting said roll into yielding pressing engagement with said shoe including resilient means operatively engaging said member.

41. In an ironing machine, the combination with a shoe, of a hollow roll adapted to cooperate therewith, bearing means for the roll mounted inside the roll for movement about an axis to one side of the roll axis for shifting the roll into and out of pressing engagement with the shoe, a member extending lengthwise inside of the roll between the ends thereof and operatively connected to said bearing means and movable therewith, and roll-shifting means including a power operated crank arm and a resilient connection between said crank arm and said member for moving the member and with it said bearing means and roll.

42. In a machine of the class described, a heated shoe, a hollow rotatable roll adapted for movement into and out of pressing contact with said shoe, and a supporting structure for said shoe and roll having a work-receiving surface beneath the shoe and roll, said structure including means for supporting said roll for rotational movement about its axis and for bodily movement about an axis to one side of the roll axis and parallel therewith, said means comprising a hollow standard extending above the work-receiving surface and a hollow member rigid with the standard projecting laterally therefrom and into said roll, means for shifting said roll into and out of pressing contact with said shoe and power driving means for rotating said roll including gearing in said standard and a shaft inside said hollow member operatively connecting the gearing to the roll.

43. In a machine of the class described, a heated shoe, a hollow rotatable roll adapted for movement into and out of pressing contact with said shoe, and a supporting structure for said shoe and roll having a work-receiving surface beneath the shoe and roll, said structure including means for supporting said roll for rotational movement about its axis and for bodily movement about an axis to one side of the roll axis and parallel therewith, said means comprising a hollow standard extending above the work-receiving surface and a member rigid with the standard projecting laterally therefrom and into said roll whereby the roll is supported from one end only, means for shifting said roll into and out of pressing contact with said shoe and power driving means for rotating said roll including gearing in said standard operatively connected to the roll.

44. In a machine of the class described, a heated shoe, a hollow rotatable roll adapted for movement into and out of pressing contact with said shoe, and a supporting structure for said shoe and roll having a work-receiving surface beneath the shoe and roll, said structure including means for supporting said roll for rotational movement about its axis and for bodily movement about an axis to one side of the roll axis and parallel therewith, said means comprising a hollow standard extending above the work-receiving surface and a member rigid with the standard projecting laterally therefrom and into said roll, power driving means for rotating said roll including gearing in said standard operatively connected to the roll and a motor adapted to drive said gearing and means for shifting said roll into and out of pressing contact with said shoe adapted at the same time to respectively effect and disconnect the driving connection between said motor and roll.

JOHN W. RACKLYEFT.